(12) United States Patent
Iverson et al.

(10) Patent No.: US 6,350,410 B1
(45) Date of Patent: Feb. 26, 2002

(54) METHOD AND COMPOSITION FOR INHIBITING BIOLOGICAL FOULING IN AN IRRIGATION SYSTEM

(75) Inventors: Carl E. Iverson; Joyce Prindle, both of Olympia, WA (US)

(73) Assignee: CH20 Incorporated, Olympia, WA (US)

( * ) Notice: Subject to any disclaimer, the term of this patent is extended or adjusted under 35 U.S.C. 154(b) by 0 days.

(21) Appl. No.: 08/421,379

(22) Filed: Apr. 13, 1995

(51) Int. Cl.[7] .................................................. A61L 9/00
(52) U.S. Cl. ..................... 422/29; 210/764; 252/175; 252/178; 252/181; 422/19; 422/28; 424/641; 514/494
(58) Field of Search .............................. 422/19, 28, 29; 210/764; 424/641; 514/494; 252/175, 181, 178

(56) References Cited

U.S. PATENT DOCUMENTS

| | | | |
|---|---|---|---|
| 1,488,097 A | 3/1924 | Creger | 424/55 |
| 2,944,967 A | 7/1960 | Dunklin et al. | 210/696 |
| 3,702,298 A | 11/1972 | Zsoldos, Jr. et al. | 210/754 |
| 4,108,772 A * | 8/1978 | Alexander | 210/764 |
| 4,497,713 A | 2/1985 | Geiger | 210/699 |
| 4,534,866 A | 8/1985 | Becker | 210/697 |
| 4,610,783 A * | 9/1986 | Hudson | 422/29 |
| 4,913,822 A | 4/1990 | Chen et al. | 210/699 |
| 5,130,052 A | 7/1992 | Kreh et al. | 252/387 |
| 5,208,031 A | 5/1993 | Kelly | 424/412 |
| 5,320,779 A | 6/1994 | Fivizzani | 252/394 |
| 5,360,550 A | 11/1994 | Clubley et al. | 210/699 |

FOREIGN PATENT DOCUMENTS

| | | | | |
|---|---|---|---|---|
| EP | 0017373 | * | 10/1980 | 422/19 |
| HU | 38594 | * | 6/1986 | |
| PL | 154449 | * | 11/1991 | |

* cited by examiner

Primary Examiner—Krisanne Thornton
(74) Attorney, Agent, or Firm—Delbert J. Barnard

(57) ABSTRACT

The present invention provides a method and composition for inhibiting biological fouling in an irrigation system. According to the invention, an effective amount of active zinc is added to irrigation water passing through an irrigation system to inhibit biological fouling. In a preferred form of the invention, the active zinc is chelated with 1-hydroxyethane 1,1-diphosphonic acid (HEDPA). In addition to inhibiting the formation of biological fouling in the system, the active zinc provides nourishment to plants irrigated by the irrigation system.

8 Claims, No Drawings

METHOD AND COMPOSITION FOR INHIBITING BIOLOGICAL FOULING IN AN IRRIGATION SYSTEM

TECHNICAL FIELD

This invention relates to a method and composition for inhibiting biological fouling in an irrigation system, and more particularly, to a method and composition which include the addition of zinc to water in an irrigation system.

BACKGROUND INFORMATION

Irrigation water is often pumped from a source, such as a pond, through an irrigation system to crops or orchards. Due to impurities in the source water, biological fouling may occur in the irrigation system. The biological fouling can develop buildups in the irrigation system, resulting in a loss of flow rate through the irrigation system. This problem is exacerbated by the common use of black polyethylene material for lines in irrigation systems, which tends to absorb heat, resulting in a proliferation of biological fouling. In addition, there is a trend toward irrigation systems designed to conserve water which have lower flow rates passing through the systems. These lower flow rate irrigation systems are prone to buildups of biological fouling since impurities are not as likely to be flushed from the system.

Currently, in order to maintain free flowing irrigation lines and emitters, an irrigation system is flushed with an excess of chlorine before and after the growing season. Generally, this process cannot be performed during the growing season since excess levels of chlorine may be toxic to plants.

Zinc is an essential element to normal plant growth and physiology. Typically in commercial farming, zinc is fed to plants in very large levels once or twice during a growing season. The zinc may be fed as a liquid concentrate containing active zinc in amounts as high as 100,000 ppm. High concentrations of zinc may also be fed in a dry form directly to the soil. Often, the concentrated zinc is applied by aerial application. This current practice of feeding high concentrations of zinc once or twice during a growing season can be potentially toxic to certain plants as well, as pose an environmental risk of run off to lakes and rivers.

DISCLOSURE OF THE INVENTION

The present invention provides a method for treating an irrigation system to inhibit the formation of biological fouling. The method includes providing water, admixing with the water an effective amount of active zinc, and pumping the water admixed with the active zinc through irrigation lines and emitters in the irrigation system to inhibit biological fouling. The active zinc is admixed with the water in an amount sufficient to inhibit the growth of biological fouling in the irrigation lines and emitters through which the water is pumped. The active zinc may be provided by zinc sulfate.

In a preferred form of the invention, the effective amount of active zinc is between about 0.1 ppm to about 10.0 ppm. In an even more preferred form of the invention, the effective amount of active zinc is between about 0.1 ppm to about 1.0 ppm.

The method of the present invention may be performed on a continual basis by repeating the step of admixing with the water an effective amount of active zinc and the step of pumping the water admixed with the active zinc through the irrigation system each time irrigation water is pumped through the system. For practicing this invention on a continual basis, it is preferred that the effective amount of active zinc is between about 0.1 ppm to about 1.0 ppm.

The method of the present invention may also be performed on a periodic basis by repeating the step of admixing with the water an effective amount of active zinc and the step of pumping the water admixed with the active zinc through the irrigation system at least one time each week when irrigation water is pumped through the system. For practicing this invention on a periodic basis, it is preferred that the effective amount of active zinc is about 10.0 ppm.

In another form of the invention, the zinc is chelated with 1-hydroxyethane 1,1-diphosphonic acid (HEDPA). In a preferred form, the zinc is chelated with HEDPA on a 1:1 molar ratio.

The present invention also provides a composition for use in an irrigation system for inhibiting biological fouling in irrigation lines and emitters in the irrigation system. The composition comprises water and active zinc. The active zinc is present in the composition in an amount sufficient to inhibit biological fouling in irrigation lines and emitters such that following pumping of the composition through an irrigation system, biological fouling is inhibited in the irrigation lines and emitters. The active zinc may be provided by zinc sulfate.

In a preferred form of the invention, the composition includes active zinc in an amount between about 0.1 ppm to about 10.0 ppm. In an even more preferred form of the invention, the active zinc is present in an amount between about 0.1 ppm and 1.0 ppm.

The composition may further include 1-hydroxyethane 1,1-diphosphonic acid (HEDPA) in an amount to chelate the active zinc. Preferably, the HEDPA is present in an amount to chelate the active zinc on a 1:1 molar ratio.

These and other advantages and features will become apparent from the detailed description of the best mode for carrying out the invention that follows.

BEST MODE FOR CARRYING OUT THE INVENTION

The present invention provides a method and composition for affecting biological fouling in an irrigation system. It has been discovered that the addition of an effective amount of active zinc to irrigation water passing through an irrigation system reduces biological fouling in the system. With decreased amounts of biological fouling in the irrigation system, irrigation lines and emitters in the system remain free flowing.

Herein, biological fouling refers to bacterial and algal growth. Such bacterial growth includes the bacteria crenothrix polyspora which is commonly found in source water and tends to cause slime growth in irrigation systems.

Active zinc for use in the present invention may be in the form of zinc sulfate. The active zinc acts as a biocide in the irrigation system to inhibit the growth of biological fouling which is detrimental to the irrigation system. In addition, the zinc is present in the water exiting the irrigation emitters onto crops or orchards. These low levels of zinc are an essential element to normal plant growth and physiology. Plants are nourished by these low levels of zinc feeding, eliminating the need for high concentrations of zinc feeding once or twice during the growing season.

Preferably, the zinc is admixed with the irrigation water at the head of the irrigation system with a metering pump. Alternatively, the zinc may be fed at satellite feed stations throughout the irrigation system. Generally, irrigation systems have flow rates through the main lines as high as eighty gallons per minute and flow rates through secondary lines as low as one half to one gallon per hour, particularly in drip irrigation systems. It is preferred that the active zinc is present in the irrigation water at about 0.1 to about 10.0 ppm. According to the present invention, the amount of active zinc may be above 10.0 ppm so long as the active zinc is not at levels which are toxic to the plants being irrigated. However, goods results have been obtained with active zinc in the irrigation water between about 0.1 and about 10.0 ppm and increased levels may do little more than add to the cost of performing this invention.

The active zinc may be fed into the irrigation water on a continual basis such that each time an irrigation system provides irrigation water to a crop or an orchard, active zinc is present in the irrigation water. If the present invention is practiced on a continual basis, it is preferred that the active zinc be present in an amount between about 0.1 and about 1.0 ppm. These low levels of active zinc inhibit biological fouling in the irrigation system and provide slow feeding of active zinc to plants being irrigated.

Alternatively, the active zinc may be fed into the irrigation water on a periodic basis such that active zinc is only admixed with the irrigation water passing through the system part of the time that irrigation water is run through the system. If the active zinc is added periodically to the irrigation water, it is preferred that the active zinc be present at about 10.0 ppm. This higher amount of active zinc provides periodic treatment of biological fouling in the irrigation system and also provides periodic feeding of active zinc to plants being irrigated without the active zinc being at levels which are potentially toxic to the plants. It is preferred that periodic feeding of zinc occur at least once a week.

In another form of the invention, the zinc is in chelated form. Preferably, the zinc is chelated with 1-hydroxyethane 1,1-diphosphonic acid (HEDPA). At a minimum, the zinc should be chelated with one part HEDPA for each one part of zinc. However, higher rates of HEDPA may be added.

HEDPA is an alkyl diphosphonate. A commercially available form of HEDPA is termed 1-hydroxyethane 1,1-diphosphonic acid and has the following structure:

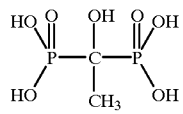

Herein HEDPA is used to describe a number of behave alike alkyl diphosphonates of the basic structure:

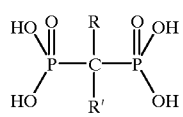

The following is a list of known HEDPA variants and their structures which indicate what constitutes and may be represented by -R and R':

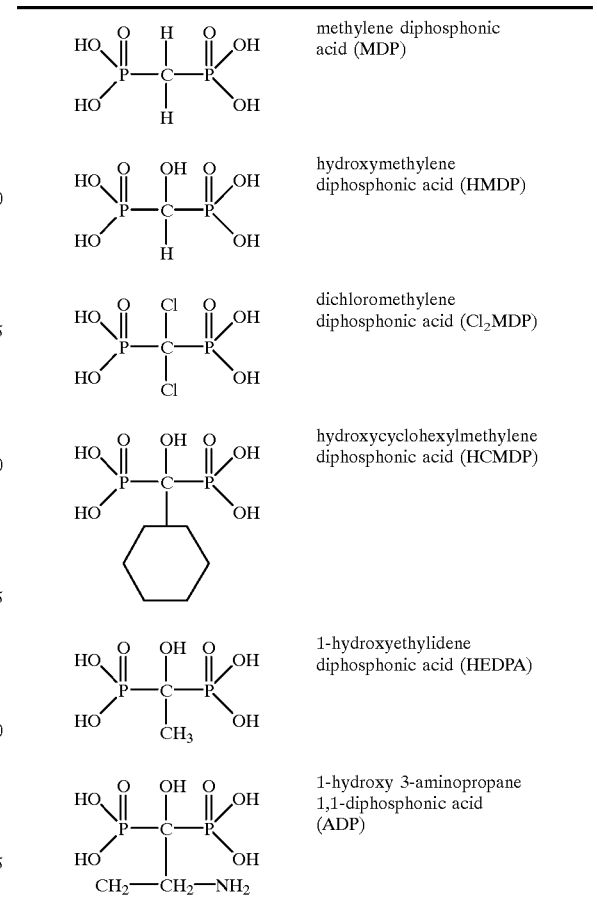

The addition of HEDPA to irrigation water may be beneficial to fruits growing on plants or trees, as described in U.S. Pat. No. 5,369,099, and copending applications relating thereto. In addition, as illustrated by our examples which follow, the chelated active zinc at about 10.0 ppm appears to provide very effective treatment of biological fouling.

The present invention also provides a composition for inhibiting biological fouling in irrigation systems. The composition includes irrigation water. Usually irrigation water is provided from sources such as ponds and lakes. Often the irrigation water includes bacteria and algae which contribute to biological fouling in the irrigation system. Active zinc is admixed with the irrigation water, according to the manner explained above. Also, the active zinc may be chelated with HEDPA, as explained above.

The present invention provides an economical and simple method for inhibiting biological fouling in irrigation systems as well as providing the nutrient zinc to plants. This method has been found to be effective on all sorts of crops and orchards which utilize irrigation systems.

The nature and substance of the instant invention as well as its objects and advantages will be more clearly understood by reference to the following specific examples.

EXAMPLE 1

A sample of pond water was obtained. The pond water was supporting various forms of algal and protozoan life which was determined by microscopy. The pond water was inoculated with a large population of bacterium escherichia coli. A plate count test was run on the pond water sample to determine the population. The results were too numerous to count. Dilution was performed with pond water to yield a population that would register on a plate count test. One liter of the sample was removed and left untreated. After five days, the untreated sample had a population of 100 organisms per milliliter.

EXAMPLE 2

A second one liter portion was taken from the pond water sample. A composition of about 2% active zinc sulfate was mixed with the water sample to yield active zinc at about 0.1 ppm. After five days, the sample treated with about 0.1 ppm active zinc yielded a population of 1 organism per milliliter.

EXAMPLE 3

A third one liter portion was taken from the pond water sample. A composition of about 2% active zinc sulfate was mixed with the water sample to yield active zinc at about 10.0 ppm. After five days, the sample treated with about 10.0 ppm active zinc yielded a population of 6 organisms per milliliter. While 10.0 ppm active zinc composition provided effective treatment of the biological fouling compared to the untreated sample, it was not expected that the 10.0 ppm active zinc composition would kill less organisms than the 0.1 ppm active zinc composition.

EXAMPLE 4

A fourth one liter portion was taken from the pond water sample. A zinc chelated product was prepared containing about 2% active zinc sulfate which was chelated on a 1:1 molar ratio with 1-hydroxyethane 1,1-diphosphonic acid (HEDPA). The chelated zinc product was added to the sample to yield chelated zinc at about 0.1 ppm. After five days, the sample treated with about 0.1 ppm chelated zinc yielded a population of 1 organism per milliliter.

EXAMPLE 5

A fifth one liter portion was taken from the pond water sample. A zinc chelated product was prepared containing about 2% active zinc sulfate which was chelated on a 1:1 molar ratio with HEDPA. The chelated zinc product was added to the sample to yield chelated zinc at about 10.0 ppm. After five days, the sample treated with about 10.0 ppm chelated zinc yielded a population of 0 organisms per milliliter.

While specific embodiments of the present invention have been shown and described in detail to illustrate the utilization of the inventive principles, it is to be understood that such showing and description have been offered only by way of example and not by way of limitation. Protection by Letters Patent of this invention and all its aspects are set forth in the appended claims. The scope of the appended claims is to be interpreted as the broadest scope that the prior art allows.

What is claimed is:

1. A method for treating an irrigation system to inhibit the formation of biological fouling, comprising:

providing water:

admixing with the water an effective amount of active zinc, the latter being present in the water in an amount sufficient to inhibit the growth of biological fouling in irrigation lines and emitters in the irrigation system through which water is pumped; and pumping the water admixed with the active zinc through the irrigation lines and emitters to inhibit biological fouling, wherein said active zinc is chelated with 1-Hydroxy ethane 1,1-diphosphonic acid (HEDPA).

2. The method of claim 1, wherein said active zinc is chelated with HEDPA on a 1:1 molar ratio.

3. The method of claim 1, wherein said effective amount of active zinc is between about 0.1 ppm to about 10.0 ppm.

4. The method of claim 3, wherein said effective amount of active zinc is between about 0.1 ppm to about 1.0 ppm.

5. The method of claim 1, further comprising repeating the step of admixing with the water an effective amount of active zinc and the step of pumping the water admixed with the active zinc through the irrigation system each time irrigation water is pumped through the irrigation system.

6. The method of claim 5, wherein said effective amount of active zinc is between about 0.1 ppm to about 1.0 ppm.

7. The method of claim 1, further comprising repeating the step of admixing with the water an effective amount of active zinc and the step of pumping the water admixed with the active zinc through the irrigation system at least one time each week when irrigation water is pumped through the irrigation system.

8. The method of claim 7, wherein said effective amount of active zinc is about 10.0 ppm.

\* \* \* \* \*